United States Patent [19]

Battiston

[11] Patent Number: 4,616,668
[45] Date of Patent: Oct. 14, 1986

[54] INVALID DEVICE HAVING INTERLOCKING TELESCOPING MEMBERS

[75] Inventor: Joseph Battiston, Clifton, N.J.

[73] Assignee: Tubular Fabricators, Industry, Inc., Passaic, N.J.

[21] Appl. No.: 661,515

[22] Filed: Oct. 16, 1984

[51] Int. Cl.[4] .......................... A61H 3/00; A45B 9/00
[52] U.S. Cl. .................................................. 135/75
[58] Field of Search ............ 403/108, 50, 51, DIG. 6; 135/107, 108, 69, 75, 84, DIG. 9, 37, 38, 39, 40, 41, 65, 66, 67

[56] References Cited

U.S. PATENT DOCUMENTS

| | | | |
|---|---|---|---|
| 1,311,855 | 7/1919 | Coince-Chevret | 403/51 |
| 3,274,330 | 9/1966 | Becker et al. | 403/23 X |
| 3,430,456 | 3/1969 | Stricker | 403/108 X |
| 3,442,276 | 5/1969 | Edwards et al. | 135/67 |
| 3,446,523 | 5/1969 | Little | 403/108 |
| 3,550,602 | 12/1970 | Hesterman et al. | 135/65 |
| 3,947,140 | 3/1976 | Thomas | 403/108 |
| 4,056,115 | 11/1977 | Thomas | 403/108 X |
| 4,085,763 | 4/1978 | Thomas | 403/108 X |

Primary Examiner—Robert A. Hafer
Assistant Examiner—Arnold W. Kramer
Attorney, Agent, or Firm—David A. Jackson; Daniel H. Bobis

[57] ABSTRACT

An arrangement of interlocking telescoping members, having particular applicability with invalid devices, such as walking canes, foldable walkers and the like, includes an outer telescoping member having a plurality of longitudinally arranged apertures; an inner telescoping member telescopically received within the outer telescoping member, the inner telescoping member including a single aperture; a push button extending outwardly through the aperture of the inner telescoping member for engagement with one of the longitudinally arranged apertures of the outer telescoping member; a spring disposed within the inner telescoping member and secured to the push button for outwardly biasing the push button through the aperture of the inner telescoping member; and a plastic, resilient sleeve snuggly surrounding the outer telescoping member at least about the longitudinally arranged apertures so as to provide a pinch free adjustment, to prevent rattle between the telescoping members, and with the sleeve being capable of having different colors thereon.

5 Claims, 5 Drawing Figures

INVALID DEVICE HAVING INTERLOCKING TELESCOPING MEMBERS

BACKGROUND OF THE INVENTION

This invention relates generally to interlocking telescoping members and, more particularly, has particular applicability to invalid devices having interlocking telescoping members.

Interlocking telescoping members are conventionally used in a plurality of different fields for different applications. Generally, an inner telescoping member is slidably received within an outer telescoping member having a plurality of longitudinally aligned apertures therein. A button device is associated with the inner telescoping member and may, for example, extend through an aperture in the inner telescoping member for engagement with one of the longitudinally aligned apertures in the outer telescoping member. To this end, a spring positioned within the inner telescoping member outwardly biases the button for engagement with one of such apertures. Examples of such arrangements are shown in U.S. Pat. No. 3,947,140 and French Pat. No. 1,040,848.

To adjust the height, length or the like of a device, the button is depressed inwardly against the force of the spring and the inner telescoping member is slidably moved within the outer telescoping member until the button is aligned with another aperture in the outer telescoping member, whereupon the spring outwardly biases the button into engagement therewith to lock the inner and outer telescoping members in a fixed relation. However, when the user presses the button inwardly against the spring and then, while the button is depressed, slidably moves the inner telescoping member with respect to the outer telescoping member, there is a tendency for the telescoping members to pinch the finger of the user during the initial sliding movement between the telescoping members.

In U.S. Pat. No. 4,056,115, the problem of pinching was solved by providing a plunger arrangement to depress the button inwardly against the force of the spring. The plunger arrangement, however, is relatively complicated and it would be impractical to use a plurality of such plunger arrangements where a plurality of longitudinally aligned apertures are provided in the outer telescoping member. Alternatively, it would be impractical to slide a single plunger arrangement along the outer telescoping member where a plurality of apertures are provided therein.

When the aforementioned telescoping arrangement is used with an invalid device, such as a cane, there is the further problem of rattling between the inner and outer telescoping members each time that the cane is hit upon the ground. Attempts have been made in the prior art to overcome such undesireable rattling problem by providing a set screw in place of or in addition to the button arrangement, for example, as disclosed in U.S. Pat. No. 4,085,763, or by providing a knurled locking nut at the lower end of the outer telescoping member. However, the use of a set screw makes it difficult to adjust the telescoping members. Further, the knurled locking nut or collar arrangement is not entirely effective against rattle.

OBJECTS AND SUMMARY OF THE INVENTION

Accordingly, it is an object of the present invention to provide interlocking telescoping members having a pinch free push button adjustment.

More particularly, it is an object of the present invention to provide interlocking telescoping members having a push button adjustment and with a plastic sleeve surrounding the outer telescoping member to provide a pinch free adjustment by the push button arrangement.

It is another object of the present invention to provide an invalid device having interlocking telescoping members which provide a pinch free adjustment thereof.

It is still another object of the present invention to provide an invalid device having interlocking telescoping members with a pinch free adjustment therebetween and a rattle prevention arrangement.

It is yet another object of the present invention to provide an invalid device having interlocking telescoping members having a plastic sleeve surrounding the outer telescoping member which provides for pinch free adjustment between the telescoping members, prevents rattle therebetween and also can be provided in various colors.

In accordance with an aspect of the present invention, an arrangement of interlocking telescoping members includes an outer telescoping member having at least one aperture; an inner telescoping member telescopically received within the outer telescoping member; button means associated with the inner telescoping member for engaging with at least one aperture; first biasing means for outwardly biasing the button means with a first force; and deformable sleeve means surrounding the outer telescoping member about the at least one aperture thereof in a tight fitting relation.

In accordance with the present invention, the sleeve means takes the form of a plastic sleeve surrounding the at least one aperture of the outer telescoping member.

The above, and other, objects, features and advantages of the present invention will become readily apparent from the following detailed description thereof which is to be read in connection with the accompanying drawings.

DETAILED DESCRIPTION OF THE PREFERRED EMBODIMENTS

Figure 1:
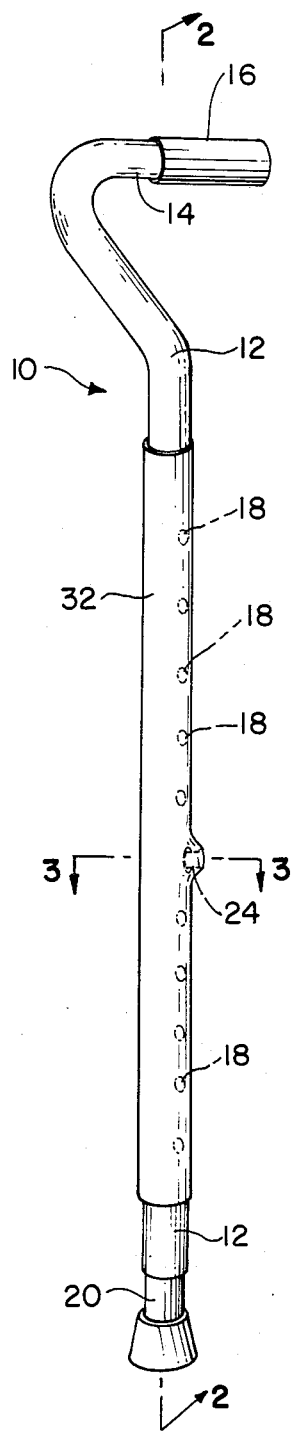
FIG. 1 is a perspective view of a cane according to one embodiment of the present invention.
Figure 2:
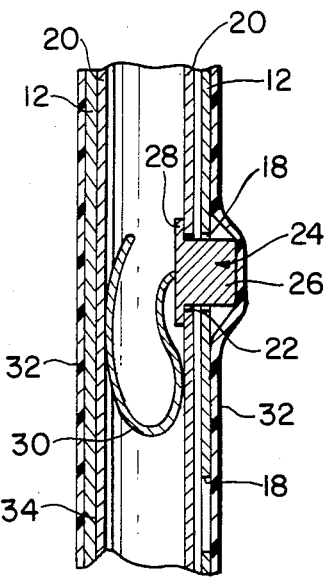
FIG. 2 is a cross-sectional view of a portion of the cane of FIG. 1, taken along line 2—2 thereof.
Figure 3:
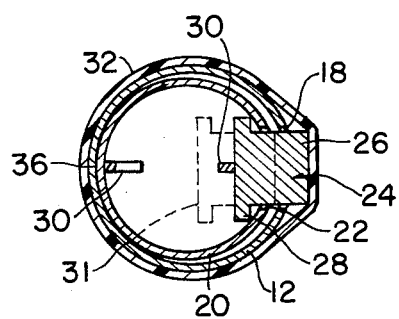
FIG. 3 is a cross-sectional view of the cane of FIG. 1, taken along line 3—3 thereof.

Referring now to the drawings in detail, and initially to FIGS. 1-3 thereof, a walking cane 10 according to one embodiment of the present invention is formed of an outer telescoping member 12 which is tubular and is bent at its upper end to provide a substantially horizontal handle 14 having a grip 16 made of rubber or the like thereon which the user grasps. Outer tubular member 12 further includes a plurality of vertically aligned apertures 18, shown in phantom in FIG. 1, the purpose of which will be readily apparent from the desciption hereinafter.

Walking cane 10 further includes an inner telescoping member 20 slidably and telescopically received within outer telescoping member 12, whereby the height of cane 10 can be adjusted for the particular user. In this regard, and referring to FIGS. 2 and 3, inner telescoping member 20 is formed with a single aperture 22. A push button 24 has a button section 26 which extends outwardly from aperture 22, and a base section 28 having a diameter larger than aperture 22 which limits the outward travel of button section 26. A spring 30, which preferably functions as a leaf spring, as shown in FIG. 2, is secured at one end thereof to base section 28 of push button 24 and the opposite end is biased against the inner wall of member 20 opposite push button 24 so as to outwardly bias push button 24 through aperture 22. In this manner, base section 28 is maintained in an abutting or near abutting relation against the inner wall of telescoping member 20.

The above arrangement is conventional. In this regard, adjustment between the outer and inner telescoping members 12 and 20 occurs as follows. To lock outer and inner members 12 and 20 together in a fixed relation, push button 24 and, more particularly, button section 26 thereof, extends from inner telescoping member 20 through one of apertures 18 to lock telescoping members 12 and 20 in a fixed relation. To adjust the height of walking cane 10, the user depresses push button 24 and, more particularly, button section 26 thereof, against the force of spring 30 out of engagement with the respective aperture 18, as shown by dashed lines 31 in FIG. 3 and, while maintaining push button 24 in this depressed condition, telescoping members 12 and 20 are slidably moved with respect to each other until push button 24 is aligned with another desired aperture 18 for engagement therewith.

However, various problems result with this arrangement. In the first place, when the user depresses push button 24 and then slidably moves telescoping members 12 and 20 with respect to each other while maintaining push button 24 in its depressed condition, there is a tendency for the user's finger to be pinched between apertures 18 and 22. Further, there is a tendency for inner and outer members 12 and 20 to rattle when cane 10 is continuously hit upon the ground when walking despite the fixed vertical relation therebetween. This results from the play between such members.

In accordance with the present invention, a plastic sleeve 32 having a thickness of, for example, 35 mil surrounds at least that portion of outer telescoping member 12 containing apertures 18, in a tight fitting relation. Of course, the thickness of the plastic sleeve may vary depending on the application. For example, the plastic can be expanded in hot water and slipped over outer telescoping member 12, whereupon when plastic sleeve 32 cools, it contracts and tightly engages outer telescoping member 12.

Preferably, plastic sleeve 32 is resilient, that is, has a memory, so that it assumes or substantially assumes its original shape after push button 24 is inserted into a different aperture 18.

As a result, plastic sleeve 32 provides a back pressure against push button 24 which biases the latter inwardly against the force of spring 30. Because the force of spring 30 is much greater than that exerted by plastic sleeve 32, base section 28 of push button 24 remains in abutment or near abutment against the inner wall of inner telescoping member 20. Thus, the back pressure of plastic sleeve 32 is applied to the entire inner telescoping member 20 so as to bias the latter opposite push button 24 against the inner wall of outer telescoping member 12, as shown along line 34 in FIG. 2 and at position 36 in FIG. 3. The free play between outer and inner telescoping members 12 and 20 is therefore eliminated so as to prevent the aforementioned rattling when walking cane 10 is hit upon the ground.

In addition, plastic sleeve 32 provides a second function that overcomes another problem in the prior art. More particularly, plastic sleeve 32 prevents the pinching effect when adjusting the telescoping members. Because the aforementioned pinching occurs when the user depresses push button 24 inwardly too far so that the user's finger is engaged within the respective aperture 18, a pinching may occur. On the other hand, in accordance with the present invention, plastic sleeve 32 protects the user's finger against pinching so as to overcome the aforementioned problem.

A third significant function of plastic sleeve 32, particularly with respect to walking canes, is to provide a color for walking cane 10. At the present time, there is a strong market for providing walking canes with different colors thereon which is aesthetic and may translate as a warning to nearby persons. Conventionally, colors are applied on the aluminum outer telescoping member 12 by a color anodizing process. However, the colors may chip, therefore reducing the aesthetic appearance of the cane. Such chipping problem is overcome by providing colored plastic sleeves 32.

Figure 4:
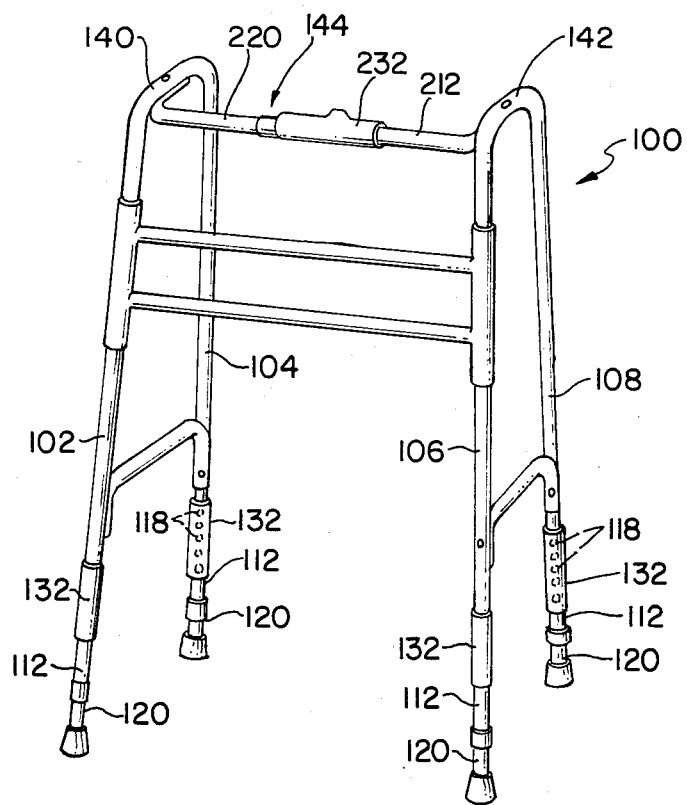
FIG. 4 is a perspective view of a foldable walker according to the present invention in its opened postion.
Figure 5:
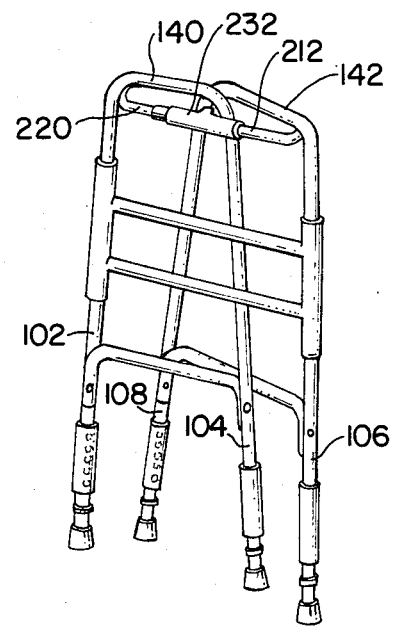
FIG. 5 is a perspective view of the foldable walker of FIG. 4 in its closed position.

Referring now to FIGS. 4 and 5, an invalid device 100 in the form of a foldable walker is provided with four adjustable support legs 102, 104, 106 and 108, each comprised of an outer telescoping member 112 and an inner telescoping member 120 similar to the arrangement aforementioned with respect to cane 10. Accordingly, each outer telescoping member 112 includes a plurality of vertically aligned apertures 118 therein and each inner telescoping member 112 includes a push button arrangement associated therewith for engaging within one of the apertures 118 of the respective outer telescoping member 112. As with the embodiment of FIGS. 1-3, the foldable walker 100 includes a plastic sleeve 132 surrounding each outer telescoping member 112 in surrounding relation to the apertures therein so as to overcome the aforementioned problems of rattling and pinching.

Foldable walker 100 includes a cross brace member 144 which permits the foldable walker to be folded in the position shown in FIG. 5. In accordance with the present invention, cross brace member 144 is formed of an outer telescoping member 212 pivotally secured to support legs 106 and 108 through a connecting member 142 connecting the legs, and an inner telescoping member 220 pivotally secured at one end thereof to support legs 102 and 104 through a connecting member 140 connecting the legs together. The opposite end of inner telescoping member 220 is telescopically and slidably received within the opposite end of outer telescoping member 212.

A plastic sleeve 232 according to the present invention is positioned in surrounding relation about outer telescoping member 212 in a tight fitting relation. The push button adjusting arrangement of cross brace member 144 is identical to that described previously with respect to the cane of FIGS. 1-3, with the exception that outer telescoping member 212 contains a single aperture since telescoping members 212 and 220 have only a single adjustment, that is, between the open position of FIG. 4 and the closed position of FIG. 5.

With cross brace member 144, in addition to the advantages described previously with respect to walking cane 10, there is the further advantage that it becomes unnecessary to provide an additional pivoting sleeve on outer telescoping member 212 for depressing the push button, as commonly used by the Medfurn division of Design Controls, Inc. of Flushing, N.Y., or to use a plastic tab pivotally secured to outer telescoping member 212 for depressing the push button, as used in the Model 86020 by Sci-O-Tech of Lancaster, Pa.

It is to be appreciated that the present invention is not limited to use with the aforementioned invalid devices, but may, for example, be used with other invalid devices, such as commodes, quad canes and the like. The present invention is also not limited to use in invalid devices, but may be used in other applications of interlocking telescoping members.

Having described specific preferred embodiments of the invention with reference to the accompanying drawings, it is to be understood that the present invention is not limited to those precise embodiments, and that various changes and modifications may be effected therein by one of ordinary skill in the art without departing from the spirit and scope of the invention as defined by the appended claims.

What is claimed is:

1. An arrangement of interlocking telescoping members for an invalid device, comprising:
    an outer telescoping member having a plurality of apertures spaced and substantially aligned along the longitudinal direction of said outer telescoping member;
    an inner telescoping member telescopically received within said outer telescoping member and having an aperture;
    button means engaging with said inner telescoping member and said outer telescoping member by extending through said aperture of said inner telescoping member and a selected aperture of said outer telescoping member, and with an outer end of said button means extending outwardly beyond said selected aperture;
    first biasing means for outwardly biasing said button means with a first force to normally bias said outer end of said button means outwardly beyond said selected aperture; and
    elastic sleeve means tightly surrounding only said outer telescoping member about said plurality of apertures thereof for biasing said button means against the force of said first biasing means, whereby to permit pinch-free depression of said button means to adjust said outer telescoping member with respect to said inner telescoping member and to prevent rattle between said inner telescoping member and said outer telescoping member.

2. An arrangement according to claim 1; wherein said button means includes a button section extending through the aperture of said inner telescoping member and a base section for limiting outward travel of said buttom section through the aperture of said inner telescoping member, and said first biasing means includes spring means within said inner telescoping member for outwardly biasing said button section through the aperture of said inner telescoping member for engagment with one of said longitudinally arranged apertures of said outer telescoping member.

3. An arrangement according to claim 1; wherein said elastic sleeve means is formed from a resilient, plastic material shrunk fit onto said outer telescoping member.

4. An arrangement according to claim 3; wherein said sleeve means has a thickness of approximately 35 mil.

5. An arrangement according to claim 1; wherein said sleeve means has a color associated therewith.

* * * * *